(12) United States Patent
Jung et al.

(10) Patent No.: US 8,657,265 B2
(45) Date of Patent: Feb. 25, 2014

(54) POROUS CERAMIC STRUCTURE, AND DEHUMIDIFICATION/HUMIDIFICATION APPARATUS COMPRISING SAME

(75) Inventors: Seong-Moon Jung, Daejeon (KR); Ju-Hyung Lee, Daejeon (KR); Jong-Sik Choi, Daejeon (KR); Sun-Joo Kim, Daejeon (KR); Ho-Yeon Lim, Yongin-si (KR); Joo-Hwan Seo, Daejeon (KR); Moon-Suk Han, Daejeon (KR)

(73) Assignee: LG Hausys, Ltd., Seoul (KR)

( * ) Notice: Subject to any disclaimer, the term of this patent is extended or adjusted under 35 U.S.C. 154(b) by 327 days.

(21) Appl. No.: 13/264,289

(22) PCT Filed: Apr. 20, 2010

(86) PCT No.: PCT/KR2010/002453
§ 371 (c)(1),
(2), (4) Date: Oct. 13, 2011

(87) PCT Pub. No.: WO2010/123251
PCT Pub. Date: Oct. 28, 2010

(65) Prior Publication Data
US 2012/0032359 A1    Feb. 9, 2012

(30) Foreign Application Priority Data

Apr. 21, 2009   (KR) .................. 10-2009-0034440

(51) Int. Cl.
*B01F 3/04*       (2006.01)
*B01D 53/06*      (2006.01)
(52) U.S. Cl.
USPC ................. 261/92; 261/101; 261/107; 95/90; 95/107
(58) Field of Classification Search
USPC ................. 95/90, 107; 261/92, 100, 101, 107
See application file for complete search history.

(56) References Cited

U.S. PATENT DOCUMENTS

| | | | | |
|---|---|---|---|---|
| 2,265,500 A | * | 12/1941 | Stuart | 261/92 |
| 3,619,987 A | * | 11/1971 | Colvin et al. | 96/111 |
| 2008/0023886 A1 | | 1/2008 | Adrian et al. | |
| 2010/0201007 A1 | * | 8/2010 | Tsuda et al. | 261/83 |

FOREIGN PATENT DOCUMENTS

| | | |
|---|---|---|
| CN | 1972970 A | 5/2007 |
| EP | 0176722 A1 | 4/1986 |
| JP | 07-132212 A | 5/1995 |
| JP | 08-270980 A | 10/1996 |
| JP | 2002-058951 A | 2/2002 |
| JP | 2002336633 A | 11/2002 |
| JP | 2003035414 A | 2/2003 |
| JP | 2005164137 A | 6/2005 |

(Continued)

*Primary Examiner* — Robert A Hopkins
(74) *Attorney, Agent, or Firm* — Nath, Goldberg & Meyer; Jerald L. Meyer; Scott Langford

(57) ABSTRACT

The present invention relates to a porous ceramic structure, and a dehumidification/humidification apparatus comprising the same. More particularly, the present invention comprises: a porous ceramic humidifying medium having an inner circumferential surface and an outer circumferential surface; a dehumidifying medium which has an inner circumferential surface and an outer circumferential surface, and which is disposed in the porous ceramic humidifying medium; and a cutoff layer formed between the inner circumferential surface of the humidifying medium and the outer circumferential surface of the dehumidifying medium. The porous ceramic structure and the dehumidification/humidification apparatus comprising same according to the present invention can easily increase the humidifying and dehumidifying capacity, simplify a flow channel, and achieve a compact design.

11 Claims, 3 Drawing Sheets

(56) References Cited

FOREIGN PATENT DOCUMENTS

| | | | |
|---|---|---|---|
| JP | 2008043899 A | 2/2008 |
| JP | 2008-194552 A | 8/2008 |
| JP | 2008302874 A | 12/2008 |
| JP | 2009068732 A | 4/2009 |
| WO | 2005/090417 A1 | 9/2005 |

\* cited by examiner

POROUS CERAMIC STRUCTURE, AND DEHUMIDIFICATION/HUMIDIFICATION APPARATUS COMPRISING SAME

FIELD OF THE INVENTION

The present invention relates to a porous ceramic structure, and a dehumidification/humidification apparatus comprising the same. More particularly, the present invention relates to a porous ceramic structure and a dehumidification/humidification apparatus comprising the structure which can easily increase the humidifying and dehumidifying capacity, simplify a flow channel, and achieve a compact design.

DESCRIPTION OF THE RELATED ART

In general, a humidification apparatus (humidifier) refers to as a device for inhaling dry air therein and discharging humid air using an air blower and the humidifier is provided with various means for evaporating or gasification of water to supply moisture to the dry air.

As one example, an ultrasonic vibrator used in a common humidifier excites water molecules and converts them into fine particles of several tens of micro size.

However, in case of using the ultrasonic vibrator there was a problem that water particles cannot travel far enough to keep uniform moisture at a wide space since the sizes of water particles discharged outside are large.

Additionally, with respect to a humidifier provided with an ultrasonic vibrator, a vibrator and an air blower have to be operated separately to consume much electric power, and further they have to be cleaned periodically. Furthermore, there were problems that when the humidifier is used for a long time, impurities are deposited in a water reservoir and thus unclear components are discharged, and the humidifier has a short life due to frequent failure of the vibrator.

In general, a dehumidifier includes an external air blower for inhaling external In general, a dehumidifier includes an external air blower for inhaling external air and an absorber for absorbing moisture contained in the external air which is inhaled through the external air blower and is passing therethrough. Further, a treated air blower for blowing the dehumidified air in which moisture, is removed when it passes through the absorber to an indoor side.

Meanwhile, dehumidifier/humidifier capable of dehumidification/humidification have been supplied in a market, however, in case of dehumidifier/humidifier using a dehumidification rotor, dehumidification rotor and polymer humidification medium are used separately.

At this time, in case of a thermal dehumidification rotor, heat of more than 100-200° C. is applied directly to the rotor for dehumidifying and thus it has to be separated systematically from the polymer humidifying medium. Therefore, there is a limitation to implementing a compact design of a product.

SUMMARY OF THE INVENTION

The present invention has been proposed to solve the drawback as described above. An object of the present invention relates to provide a porous ceramic structure and a dehumidification/humidification apparatus comprising the structure which can easily increase the humidifying and dehumidifying capacity, simplify a flow channel, and achieve a compact design.

According to one embodiment of the present disclosure, provided is a porous ceramic structure comprising: a porous ceramic humidifying medium having an inner circumferential surface and an outer circumferential surface; a dehumidifying medium which has an inner circumferential surface and an outer circumferential surface, and which is disposed in the porous ceramic humidifying medium; and a cutoff layer formed between the inner circumferential surface of the humidifying medium and the outer circumferential surface of the dehumidifying medium.

According to another embodiment of the present disclosure, provided is a dehumidification/humidification apparatus comprising:
a housing which has one or more of in-port and out-port;
a porous ceramic structure comprising: a porous ceramic humidifying medium which is disposed in the housing, and which has an inner circumferential surface and an outer circumferential surface; a dehumidifying medium which has an inner circumferential surface and an outer circumferential surface, and which is disposed in the porous ceramic humidifying medium; and a cutoff layer formed between the inner circumferential surface of the humidifying medium and the outer circumferential surface of the dehumidifying medium;
a driving unit which rotates the dehumidifying medium;
a heater which generates the dehumidifying medium; and
a water reservoir which provides water to the humidifying medium.

ADVANTAGEOUS EFFECTS OF INVENTION

The porous ceramic structure and the dehumidification/humidification apparatus comprising the same can easily increase the humidifying and dehumidifying capacity, simplify a flow channel, and achieve a compact design.

BRIEF DESCRIPTION OF THE DRAWINGS

The above and other aspects, features and advantages of certain exemplary embodiments of the present invention will be more apparent from the following description taken in conjunction with the accompanying drawings, in which.

DETAILED DESCRIPTION OF EXEMPLARY EMBODIMENTS

Figure 1:
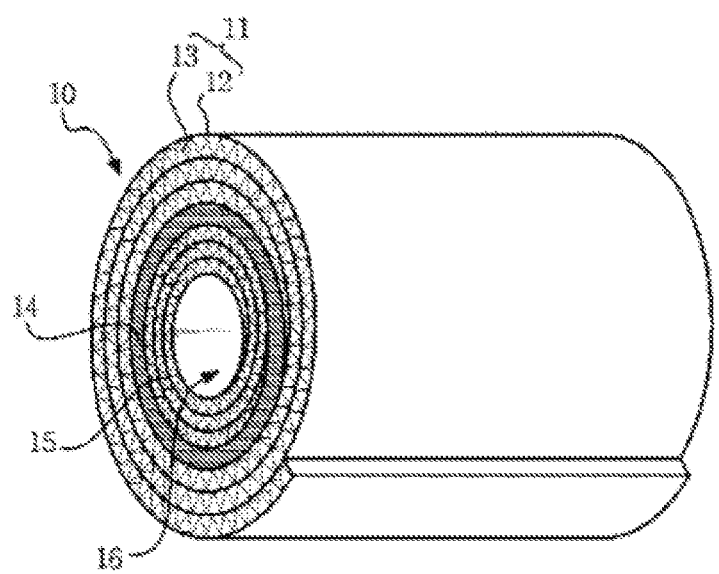
FIG. 1 is a perspective view of a porous ceramic structure according to one embodiment of the present invention.

Exemplary embodiments of the porous ceramic structure and dehumidification/humidification apparatus comprising the same will be described below in detail with reference to the accompanying drawings. Wherever possible, the same reference numerals will be used to refer to the same elements throughout the specification, and a duplicated description thereof will be omitted.

FIG. 1 is a perspective view of a porous ceramic structure (10) according to one embodiment of the present invention. The present invention relates to a porous ceramic structure (10). More particularly, the present invention relates to a porous ceramic structure (10) comprising: a porous ceramic humidifying medium (11) having an inner circumferential surface and an outer circumferential surface; a dehumidifying medium (15) which has an inner circumferential surface and an outer circumferential surface, and which is disposed in the porous ceramic humidifying medium; and a cutoff layer (14) formed between the inner circumferential surface of the humidifying medium (11) and the outer circumferential surface of the dehumidifying medium.

Porous Ceramic Humidifying Medium (11)

Hereinafter, a porous ceramic humidifying medium (11) included in the humidification apparatus according to one embodiment of the present invention will be described in detailed.

The porous ceramic humidifying medium (11) may include a ceramic flat paper (12) and a ceramic corrugated paper (13) attached to the ceramic flat paper (12), and may be a porous ceramic paper having a honeycomb structure.

In the present embodiment, the porous ceramic humidifying medium can be fabricated using the ceramic paper, and thus mass production thereof with a high productivity and easy control of pore characteristics (for example, pore size and porosity, etc.) can be performed. The said ceramic flat paper and ceramic corrugated paper (hereinafter, referred to as "ceramic paper") can be made using a ceramic fiber.

In the present embodiment, the ceramic fiber to be used for preparing the ceramic paper generally has a diameter of 1-20 micron and an average length of the ceramic fiber may be 0.1-10 mm, preferably. When the length of the ceramic fiber is less than 0.1 mm, strength of ceramic paper may be decreased, and when it exceeds 10 mm, it is difficult to disperse the fiber uniformly within raw material slurry, and thereby causing the paper to be non-uniform.

The ceramic fiber used in the present embodiment may be a material containing aluminum and/or silica. In more detail, the ceramic fiber may be one or more selected from a group consisting of but not limited to silica, alumina, silica-alumina, aluminosilicate, aluminoborosilicate, mullite and fiber glass.

The ceramic paper of the present invention may further comprise 0.1-100 parts by weight of organic fiber based on 100 parts by weight of the ceramic fiber. The example of the organic fiber used in the present invention may be a natural fiber such as softwood pulp, wood fiber or hemp, etc. and a synthetic fiber such as nylon, rayon, polyester, polypropylene, polyethylene, aramid and acrylic, etc., and combination thereof.

The said organic fiber may be comprised in an amount of 0.1-100 parts by weight based on 100 parts by weigh of the ceramic fiber. When the content of the organic fiber is less than 0.1 part by weight, it is difficult to maintain a tensile strength of the ceramic paper and thereby causing the wave-formation thereof during the fabrication process to be difficult. Furthermore, when the content of the organic fiber exceeds 100 parts by weight, a porosity of the ceramic humidifying medium is increased excessively and thereby decreasing strength thereof.

The ceramic paper of the present invention may further comprise a binder of 1.0-50 parts by weight together with the ceramic fiber and the organic fiber as described above. In the present invention, an organic binder may be used preferably. The example of the organic binder may be an epoxy group binder, sodium carboxymethylcellulose (CMC), polyacrylamide (PAM), polyethyleneoxide (PEO), methylcellulose, hydroxyethylcellulose, refined starch, dextrin, polyvinylalcohol, polyvinylbutyral, polymethyl(metha)acrylate, polyethylene glycol, paraffin, wax emulsion and microcrystalline wax, and combination thereof.

The binder may be preferably comprised in an amount of 1.0-50 parts by weight based on 100 parts by weight of the ceramic fiber. When the binder content is less than 1.0 part by weight, bonding force between fibers may be decreased. Further, when the binder content exceeds 50 parts by weight, fluidity and adhesive property of the ceramic paper are increased and thereby making workability and strength of the porous ceramic humidifying medium to be decreased.

In the present invention, the porous ceramic humidifying medium may include a first coating layer which is formed on the ceramic fiber and comprises one or more component selected from a group of consisting of silicon, aluminum and zirconium.

The porous ceramic humidifying medium may further comprise a second coating layer formed on a surface of the first coating layer, and the second coating layer serves as an inorganic binder to keep the bonding between the ceramic fibers.

The first coating layer may serve as a buffer layer or primer layer between the ceramic paper and the second coating layer, and in more detail, serves to protect the ceramic fiber and at the same time to enforce adhesive force to the second coating layer.

The first coating layer may comprise one or more component selected from a group consisting of silica, aluminum and zirconium. In more detail, the first coating layer may comprise one or more component selected from a group consisting of silica, silane, siloxane, alumina, zirconia, aluminum silicate, compound capable of being cured through sol-gel process and enforcing wet strength of the ceramic paper, and curable polymer.

In the present embodiment, the first coating layer may preferably comprise silica or aluminum silicate in terms of excellent affinity to the components consisting of the second coating layer (such as aluminum phosphate, etc.), but it is not limited thereto.

The second coating layer may comprise aluminum component and phosphorous component. At this time, atomic ratio of phosphorous and aluminum (P/Al) contained in the second coating layer may be 3-50, preferably.

When the atomic ratio is less than 3, the coating layer may not be formed smoothly, and when the atomic ratio exceeds 50, a surface of fiber may be damaged to decrease strength. Even though it is not defined specially thereto, the second coating layer may comprise aluminum phosphate, preferably, and it is more preferred that two phases of $Al(PO_3)_3$ (aluminum metaphosphate) and $AlPO_4$ (aluminum orthophosphate) exist in a mixed state.

As the other component of the second coating layer, only aluminum may be comprised. I.e., the first coating layer is coated with proper amount of an alumina sol containing 5-30% of solid, fully dried at 100° C. and heated at a temperature of 900 to 1200° C. As a result, mechanical strength of the fiber is increased and bonding force between the fibers is enhanced by forming the alumina coating layer over the silica coating layer which is formed at the fiber surface and a binding region between the fibers. Above all, there is a merit that corrosion resistance is added by forming the chemically stable alumina coating layer on the fiber surface.

As described below, in the present invention, an inorganic binder precursor solution is used while forming the first and second coating layer, and thus the coating can be uniformly performed by using the capillary effect of the porous ceramic form (ceramic paper). Therefore, a problem to the pore control caused by the non-uniform coating can be solved. Further, the binder precursor having good reactivity is chemically combined with the ceramic fiber to enhance the bonding force between the fibers, thereby adding excellent mechanical strength to the humidifying medium.

Further, the first and/or second coating layer may further comprise one or more compound containing magnesium, calcium and boron with a view to increasing the boding force between the fibers. The said component increase the bonding force of the inorganic hinder and enhance the thermal stability at high temperature by partially substituting ions such as an aluminum ion contained in the coating layer.

The example of the compound containing boron which can be used in the present invention may be boron, but not limited thereto. The said components may be contained but not limited thereto in an amount of 0.1 to 10 parts by weight based on 100 parts by weight of the total components composing the first or second coating layer, preferably.

Each coating layer may further comprise the proper amount of an oxide ceramic particle such as clay, alumina, zeolite, silica, zirconia and/or titania to enhance the mechanical strength and to control the pore characteristics of the ceramic humidifying medium. The impregnation step of the oxide ceramic particle may be conducted together with the coating solution after dispersing a certain amount of the ceramic particle to the coating solution during the preparation of the ceramic paper, i.e., the first or second coating process.

Further, the porous ceramic humidifying medium (11) may have a hollow tube form which has the inner circumferential surface and outer circumferential surface, and the inner and outer circumferential diameter may be 15 cm to 20 cm. When the inner diameter of the porous ceramic humidifying medium (11) is bigger than the said figure, the humidifying capacity may be decreased.

The porous ceramic humidifying medium having the said structure may be prepared as described below.

The ceramic fiber such as aluminosilicate or mullite, pulp and organic binder are mixed to obtain the ceramic flat paper.

At this time, the ceramic flat paper is corrugated to prepare the ceramic corrugated paper, and the ceramic corrugated paper is attached to the ceramic flat paper to obtain the porous ceramic paper.

The ceramic honeycomb is prepared by winding the porous ceramic paper to a roll shape. At this time, the diameter of the ceramic honeycomb may be controlled to the size of the humidification apparatus.

The first process of the prepared ceramic honeycomb is performed by subjecting to the first dip coating to a silica sol (solid 25 parts by weight), drying at a temperature of 100☐ to 200☐ for 1 to 2 hours, and heating at a temperature of 500☐ to 1000☐. Then, the porous ceramic humidifying medium is prepared by subjecting the second dip coating to a alumina phosphate solution, drying at a temperature of 100☐ to 300☐ for 1 to 2 hours, and then heating at a temperature of 600☐ to 1000☐.

Further, the speed of water absorption and transmission of the porous ceramic humidifying medium to be used as a humidifying medium is closely related to a pore size, pore distribution and total porosity.

Namely, the size distribution of the 95% of total pores of the porous ceramic humidifying medium (110) should be 10 µm to 200 µm to smoothly perform the water absorption and transmission to the upper part of the ceramic humidifying medium. Preferably, it should be 20 µm to 150 µm, and more preferably 30 µm to 100 µm.

In case that there are many pores having the size of less than 10 µm, the water absorption is conducted only at the water contacting region and the water cannot be rapidly delivered to the upper part, thereby decreasing the humidifying capacity. And, in case that there are many pores having the size of more than 200 µm, the entire mechanical strength of the porous ceramic humidifying medium is decreased, thereby causing the workability to be lower.

Further, the total porosity should be 40% to 80%, preferably 50% to less than 75%, more preferably 60% to less than 70%.

When the total porosity is less than 40%, the absorption and transmission of water is not conducted properly and thereby causing the humidifying medium not functioning properly, and when the porosity is more than 80%, the entire strength of the ceramic humidifying medium is decreased, thereby causing the workability to be lower.

On the other hand, the porous ceramic humidifying medium in the present embodiment may contain one or more component selected from a group consisting of cordierite, silicon carbide, silicon nitride and aluminum titanate.

The porous ceramic humidifying medium is prepared by mixing the power of cordierite, silicon carbide, silicon nitride and aluminum titanate with the inorganic binder, organic binder, pore forming agent, lubricant and water, and by extruding.

In the prepared porous ceramic humidifying medium, about 99% of the pore are distributed in a small region having the size of 10 µl to 25 µm, and the total porosity is 40% to 45%.

In case of the ceramic humidifying medium using the ceramic paper, the pore distribution is diversely 10 µm to 200 µm, and water absorption and transmission is rapid because most of the total pores have the size of more than 30 µm and the porosity is more than 60%. On the other hand, the ceramic humidifying medium using the ceramic powder with an extruding method has a handicap or slow water absorption and transmission.

Further, the porous ceramic humidifying medium composing the humidification apparatus according to the present invention may further comprise an antibacterial coating layer. When the humidification apparatus is used for long periods of time, peat moss or various foreign substances are settled in the ceramic humidifying medium. In order to prevent the harmful foreign substances generated therefrom to be excreted outside during the humidifying operation, a photocatalyst such as nanosilver or titanium dioxide ($TiO_2$) may be coated after the preparation of the porous ceramic humidifying medium, for example, after the first or second coating.

The porous ceramic humidifying medium is very porous in a view of fine structure, and therefore has wide specific surface area which is an advantageous impregnation property to apply the antibacterial coating directly thereto.

Cutoff Layer (14)

The cutoff layer (14) contained in the porous ceramic structure according, to one embodiment of the present invention is formed between the porous ceramic humidifying medium (11) described above and the dehumidifying medium which will be described below, and prevents the interference between a dehumidifying work and humidifying work.

For example, this cutoff layer (14) may be formed by using a metal, and an inorganic binder having high solid content, but not limited thereto.

Herein, the inorganic binder may include water, silica sol, clay and alumina ($Al_2O_3$).

For example, the inorganic binder may be prepared as a paste by adding 80 g of water, 5 g to 15 g of silica sol, 10 g to 20 g of clay and 15 g to 30 g of alumina ($Al_2O_3$) followed, by stirring.

The porous ceramic structure may be prepared as follows: the inorganic hinder is coated on the inner circumferential surface of the porous ceramic humidifying medium (11).

Then, the humidifying medium (15) is attached to the inside of the porous ceramic humidifying medium, and dried at a temperature of 60□ to 100□. After drying, the inorganic binder is cured by heating thereof at a temperature of 300□ to 500□ to obtain the porous ceramic structure.

Dehumidifying Medium (15)

The dehumidifying medium (15) comprises the ceramic flat paper and ceramic corrugated paper which are described at "Porous ceramic humidifying medium", and description for the overlapped part is omitted.

Specifically, the ceramic flat paper is prepared by mixing a ceramic fiber such as aluminosilicate or mullite, pulp and organic binder.

At this time, the corrugated paper is prepared by corrugating the ceramic flat paper, and the ceramic corrugated paper is attached on the ceramic flat paper to obtain the porous ceramic paper.

A ceramic honeycomb is prepared by winding the porous ceramic paper to a roll form. At this time, the diameter of the ceramic honeycomb may be controlled according to the size of the humidifying apparatus.

The dehumidifying medium is prepared by subjecting the prepared ceramic honeycomb to dip coating with slurry which is prepared with 42 parts by weight of zeolite, 0.5 part by weight of polyvinylalcohol (PVA), 4.5 parts by weight of acryl binder and 53 parts by weight of water. Then, the resulting material is dried at a temperature of 100□ to 150□ for 1 to 2 hours, and heated at a temperature of 400□ to 600□ to obtain the dehumidifying medium.

Further, the dehumidifying medium (14) may have a hollow tube shape having the inner and outer circumferential surfaces, and the inner and outer diameters may be 4 cm to 15 cm. The inner diameter of the dehumidifying medium (11) may be decrease by the size of a mechanical apparatus of the rotating part, and the outer diameter may be increase according to the required dehumidifying capacity.

The porous ceramic structure comprised as described above can perform humidification and dehumidification, and achieve a compact design.

Dehumidification/Humidification Apparatus

Figure 2:
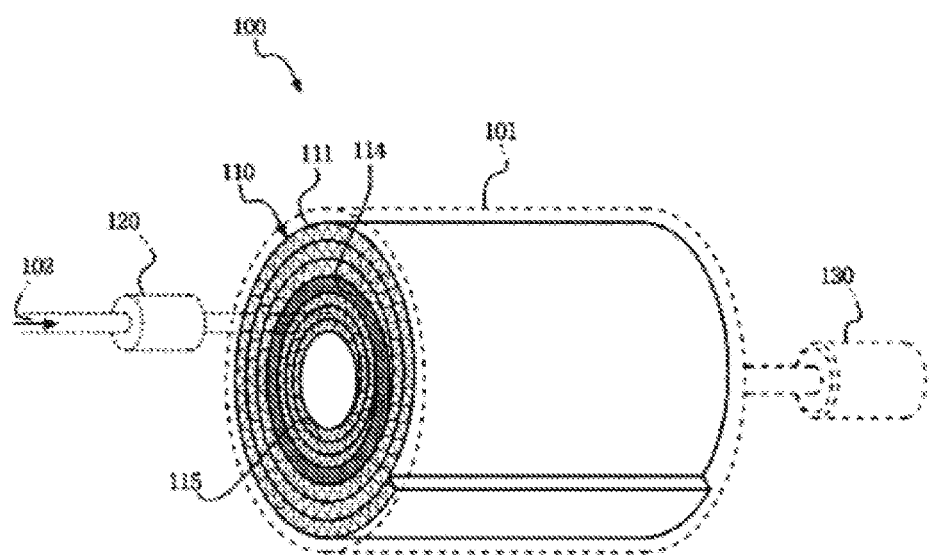
FIG. 2 is a perspective view of main parts of the dehumidification/humidification apparatus according to one embodiment of the present invention.
Figure 3:
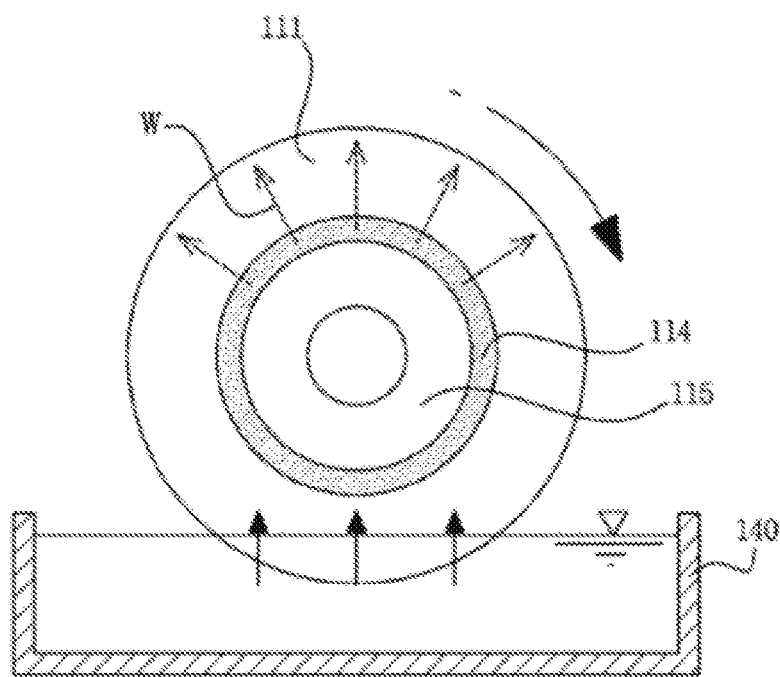
FIG. 3 is a scheme showing an operation of the dehumidification/humidification apparatus according to one embodiment of the present invention.

FIG. 2 is a perspective view of main parts of the dehumidification/humidification apparatus according to one embodiment of the present invention, and FIG. 3 is a scheme showing an operation of the dehumidification/humidification apparatus according to one embodiment of the present invention.

The dehumidification/humidification apparatus (100) according to one embodiment of the present invention comprises: a housing (101) which has one or more of in-port (102) and out-port (not illustrated); and the porous ceramic structure (110) comprising the porous ceramic humidifying medium (111) which is disposed in the housing and has an inner circumferential surface and an outer circumferential surface, the dehumidifying medium (115) which has an inner circumferential surface of the and an outer circumferential surface and is disposed in the porous ceramic humidifying medium (111), and the cutoff layer (114) formed between the inner circumferential surface of the humidifying medium (111) and the outer circumferential surface of the dehumidifying medium (115).

At this time, the porous ceramic structure (110) is identical to the porous ceramic structure (10) described through FIG. 1, and the specific description thereof is omitted.

Further, the dehumidification/humidification apparatus (100) comprises a driving unit (130) which rotates the dehumidifying medium (115), a heater (120) which generates the dehumidifying medium (115) and a water reservoir (140) which provides water to the humidifying medium (111).

At this time, the driving unit (130) may contain a motor and a driving axle mounted in the motor. The inner circumferential surface of the dehumidifying medium (115) of the porous ceramic structure (110) is mounted on a longisection of the driving axle, and the porous ceramic structure (110) rotates with the driving axle while the motor rotates.

The water reservoir (140) may be a conventional water tank, and the porous ceramic structure (110) may be disposed to be partly immersed to the water reservoir (140) in order to reserve water which is provided from the water supplying unit (130). At this time, it is preferred that only the porous ceramic humidifying medium (111) is immersed into the water reservoir.

Further, the dehumidification/humidification apparatus (100) according to one embodiment of the present invention may further comprise a fan (not illustrated) which inhales the outer air to the inside of the housing (120) and blows the air to the porous ceramic structure (110). The fan may be mounted to an in-port of the housing (101).

The housing (101) composes the dehumidification/humidification apparatus according to one embodiment of the present invention has multiple in-ports and out-ports.

For example, the in-port inflowing the air passing through the dehumidifying medium (115) and the out-port inflowing the air passing through the humidifying medium (111) may be consisted separately. And, in the process of passing through the dehumidifying medium (115), the in-port (102) for generation and the in-port for dehumidifying may be consisted separately.

In order to absorb the water absorbed in the dehumidifying medium (115), the heater (120) is mounted to the in-port (102) for generation.

At this time, the heater (120) may be a conventional heater or hot wire.

The dehumidification/humidification apparatus (100) according to one embodiment of the present invention may further comprise an air filter (150) purifying the air inhaled from outside, and the air filter may be mounted to the out-port (not illustrated) of the housing or the in-port.

Herein, the air filter may be various filters such as conventional dust removal filter, toxic gas (formaldehyde or VOC gas) adsorption filter, and antibacterial filter.

Further, filler generating healthful fragrances to a human body such as aroma fragrance or phytoncide fragrance and other various fragrances may be filled inside the air filter.

The dehumidification/humidification apparatus (100) according to one embodiment of the present invention may further comprise a control unit (not illustrated) which is electrically connected to the driving unit (130) and controls a rotation direction and rotation speed of the driving unit, and a humidity sensor (not illustrated) which is electrically connected to the control unit and measures the humidity of the indoor air.

A humidifying process in the dehumidification/humidification apparatus (100) described above will be described below with reference to the accompanying drawings.

Referring to FIG. 3, porous ceramic structure (110) contained in the dehumidification/humidification apparatus (100) according to one embodiment of the present invention is disposed to be partly immersed in the water reservoir (140). Therefore, the porous ceramic structure (110) may contain large quantity of water therein due to high porosity and capillary pressure.

At this time, a pore of the porous ceramic structure (110) is very fine with the size of tens of micrometers to hundreds of micrometers, and the porosity is very high to occupy the 40% to 80% volume of the porous ceramic structure (110).

The dehumidification/humidification apparatus (100) according to one embodiment of the present invention may use a natural evaporation at the porous ceramic humidifying medium (111).

As described above, the porous ceramic humidifying medium (111) contains micropores, and may include large quantity of water due to high porosity.

At this time, the porous ceramic humidifying medium (111) has the honeycomb configuration which has large contact surface area and micropores which has large specific surface area, thereby increasing the contact surface area with the air.

Namely, evaporation is smoothly conducted in the porous ceramic humidifying medium (111) having large contact surface area with the air due to the micropores and honeycomb configuration, and thus, the medium can supply water to the air passing through the porous ceramic humidifying medium (111).

On the other hand, the outer air is inhaled to the inside of the housing (101), and the inhaled air is blowed to the porous ceramic humidifying medium (111) through a fan.

At this time, the air passed through the porous ceramic humidifying medium (111) contains water as a fine particle, and exhaled to the outside through the out-port (not illustrated) of the housing (101).

On the other hand, the porous ceramic humidifying medium (111) may rotates by the driving unit (130), and water can be uniformly distributed inside by rotating the porous ceramic humidifying medium (111), and water absorption may be increased by immersing other parts through the rotation as well as the firstly immersed part of the porous ceramic humidifying medium (111).

Herein, the porous ceramic humidifying medium (111) may be a hollow cylinder, and the water is absorbed to the humidifying medium by the capillary phenomenon after containing water to the water reservoir and stopping the heater. At this time, the dried air passed through the humidifying medium may have moisture and the humidifying capacity arises. In order to increase the humidifying capacity, the porous ceramic humidifying medium (111) may be rotated.

When the water is removed from the water reservoir, and the heater is operated, the dehumidifying rotor inside is activated, and the moisture from the humid air is absorbed to a desiccant, dehumidified by the rotation of the rotor, naturally cooled and then collected to a separate water reservoir.

While the invention has been described with respect to the above specific embodiments, it should be recognized that various modifications and changes may be made and also fall within the scope of the invention as defined by the claims that follow.

What is claimed is:

1. A porous ceramic structure comprising: a porous ceramic humidifying medium having an inner circumferential surface and an outer circumferential surface; a dehumidifying medium which has an inner circumferential surface and an outer circumferential surface, and which is disposed in the porous ceramic humidifying medium; and a cutoff layer formed between the inner circumferential surface of the humidifying medium and the outer circumferential surface of the dehumidifying medium.

2. The porous ceramic structure of claim 1, wherein the inner diameter and outer diameter of the porous ceramic humidifying medium is 15 cm to 20 cm, respectively.

3. The porous ceramic structure of claim 1, wherein the inner diameter and outer diameter of the humidifying medium is 4 cm to 15 cm, respectively.

4. The porous ceramic structure of claim 1, wherein the cutoff layer is made from an inorganic binder.

5. The porous ceramic structure of claim 4, wherein the inorganic binder comprises water, silica sol, clay and aluminum oxide ($Al_2O_3$).

6. A dehumidification/humidification apparatus comprising:
    a housing which has one or more of in-port and out-port;
    a porous ceramic structure comprising: a porous ceramic humidifying medium which is disposed in the housing, and which has an inner circumferential surface and an outer circumferential surface; a dehumidifying medium which has an inner circumferential surface and an outer circumferential surface, and which is disposed in the porous ceramic humidifying medium; and a cutoff layer formed between the inner circumferential surface of the humidifying medium and the outer circumferential surface of the dehumidifying medium;
    a driving unit which rotates the dehumidifying medium;
    a heater which generates the dehumidifying medium; and
    a water reservoir which provides water to the humidifying medium.

7. The dehumidification/humidification apparatus of claim 6, wherein the humidifying medium is partly immersed in the water reservoir.

8. The dehumidification/humidification apparatus of claim 6, wherein the inner diameter and outer diameter of the porous ceramic humidifying medium is 15 cm to 20 cm, respectively.

9. The dehumidification/humidification apparatus of claim 6, wherein the inner diameter and outer diameter of the humidifying medium is 4 cm to 15 cm, respectively.

10. The dehumidification/humidification apparatus of claim 6, wherein the cutoff layer is made from an inorganic binder.

11. The dehumidification/humidification apparatus of claim 10, wherein the inorganic binder comprises water, silica sol, clay and aluminum oxide ($Al_2O_3$).

* * * * *